US008267837B2

(12) United States Patent
Heap et al.

(10) Patent No.: US 8,267,837 B2
(45) Date of Patent: Sep. 18, 2012

(54) METHOD AND APPARATUS TO CONTROL ENGINE TEMPERATURE FOR A HYBRID POWERTRAIN

(75) Inventors: Anthony H. Heap, Ann Arbor, MI (US); John L. Lahti, Novi, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1034 days.

(21) Appl. No.: 12/234,034

(22) Filed: Sep. 19, 2008

(65) Prior Publication Data

US 2009/0118090 A1 May 7, 2009

Related U.S. Application Data

(60) Provisional application No. 60/985,983, filed on Nov. 7, 2007.

(51) Int. Cl.
*B60W 10/06* (2006.01)
*B60W 10/10* (2006.01)

(52) U.S. Cl. .......................................................... 477/98

(58) Field of Classification Search ..................... 477/98
See application file for complete search history.

(56) References Cited

U.S. PATENT DOCUMENTS

| | | | | |
|---|---|---|---|---|
| 6,832,148 | B1 | 12/2004 | Bennett | |
| 6,868,318 | B1 | 3/2005 | Cawthorne | |
| 7,154,236 | B1 | 12/2006 | Heap | |
| 7,637,833 | B2 * | 12/2009 | Fukushiro et al. ............ | 475/121 |
| 2005/0076958 | A1 | 4/2005 | Foster | |
| 2005/0077867 | A1 | 4/2005 | Cawthorne | |
| 2005/0077877 | A1 | 4/2005 | Cawthorne | |
| 2005/0080523 | A1 | 4/2005 | Bennett | |
| 2005/0080527 | A1 | 4/2005 | Tao | |
| 2005/0080535 | A1 | 4/2005 | Steinmetz | |
| 2005/0080537 | A1 | 4/2005 | Cawthorne | |
| 2005/0080538 | A1 | 4/2005 | Hubbard | |
| 2005/0080539 | A1 | 4/2005 | Hubbard | |
| 2005/0080540 | A1 | 4/2005 | Steinmetz | |
| 2005/0080541 | A1 | 4/2005 | Sah | |
| 2005/0182526 | A1 | 8/2005 | Hubbard | |
| 2005/0182543 | A1 | 8/2005 | Sah | |
| 2005/0182546 | A1 | 8/2005 | Hsieh | |
| 2005/0182547 | A1 | 8/2005 | Sah | |
| 2005/0189918 | A1 | 9/2005 | Weisgerber | |
| 2005/0252283 | A1 | 11/2005 | Heap | |
| 2005/0252305 | A1 | 11/2005 | Hubbard | |
| 2005/0252474 | A1 | 11/2005 | Sah | |
| 2005/0255963 | A1 | 11/2005 | Hsieh | |
| 2005/0255964 | A1 | 11/2005 | Heap | |
| 2005/0255965 | A1 | 11/2005 | Tao | |
| 2005/0255966 | A1 | 11/2005 | Tao | |
| 2005/0255967 | A1 | 11/2005 | Foster | |
| 2005/0255968 | A1 | 11/2005 | Sah | |
| 2005/0256617 | A1 | 11/2005 | Cawthorne | |
| 2005/0256618 | A1 | 11/2005 | Hsieh | |
| 2005/0256623 | A1 | 11/2005 | Hubbard | |
| 2005/0256625 | A1 | 11/2005 | Sah | |

(Continued)

*Primary Examiner* — Sherry Estremsky

(57) ABSTRACT

An internal combustion engine is connected to a transmission to transmit tractive power to a driveline. Engine coolant temperature is determined, and power output of the engine is adjusted based upon the coolant temperature and preferred coolant temperature range. The transmission is controlled to transmit tractive power to the driveline to meet an operator torque request based upon the adjusted power output of the engine.

20 Claims, 3 Drawing Sheets

U.S. PATENT DOCUMENTS

2005/0256626 A1 11/2005 Hsieh
2005/0256627 A1 11/2005 Sah
2005/0256629 A1 11/2005 Tao
2005/0256631 A1 11/2005 Cawthorne
2005/0256633 A1 11/2005 Heap
2005/0256919 A1 11/2005 Cawthorne
2006/0068971 A1* 3/2006 Kobayashi ...................... 477/37
2006/0183596 A1* 8/2006 Etchason et al. ................ 477/98
2006/0194670 A1 8/2006 Heap
2007/0078580 A1 4/2007 Cawthorne
2007/0093953 A1 4/2007 Heap
2007/0149348 A1 6/2007 Holmes
2007/0191181 A1 8/2007 Burns
2007/0225886 A1 9/2007 Morris
2007/0225887 A1 9/2007 Morris
2007/0225888 A1 9/2007 Morris
2007/0225889 A1 9/2007 Morris
2007/0260381 A1 11/2007 Sah
2007/0276569 A1 11/2007 Sah
2007/0284162 A1 12/2007 Zettel
2007/0284163 A1 12/2007 Heap
2007/0284176 A1 12/2007 Sah
2007/0285059 A1 12/2007 Zettel
2007/0285060 A1 12/2007 Zettel
2007/0285061 A1 12/2007 Zettel
2007/0285063 A1 12/2007 Zettel
2007/0285097 A1 12/2007 Zettel
2008/0004779 A1 1/2008 Sah
2008/0028879 A1 2/2008 Robinette
2008/0032855 A1 2/2008 Sah
2008/0064559 A1 3/2008 Cawthorne
2008/0064562 A1 3/2008 Zettel
2008/0103003 A1 5/2008 Sah
2008/0119320 A1 5/2008 Wu
2008/0119321 A1 5/2008 Heap
2008/0120000 A1 5/2008 Heap
2008/0120001 A1 5/2008 Heap
2008/0120002 A1 5/2008 Heap
2008/0176706 A1 7/2008 Wu
2008/0176709 A1 7/2008 Wu
2008/0181280 A1 7/2008 Wang
2008/0182696 A1 7/2008 Sah
2008/0183372 A1 7/2008 Snyder
2008/0234097 A1 9/2008 Sah
2008/0236921 A1 10/2008 Huseman
2008/0243346 A1 10/2008 Huseman
2008/0249745 A1 10/2008 Heap
2008/0262694 A1 10/2008 Heap
2008/0262698 A1 10/2008 Lahti
2008/0272717 A1 11/2008 Gleason
2008/0275611 A1 11/2008 Snyder
2008/0275624 A1 11/2008 Snyder
2008/0275625 A1 11/2008 Snyder
2008/0287255 A1 11/2008 Snyder
2008/0312034 A1* 12/2008 Shultz et al. .................... 477/98
2009/0069148 A1 3/2009 Heap
2009/0069989 A1 3/2009 Heap
2009/0070019 A1 3/2009 Heap
2009/0082170 A1 3/2009 Heap
2009/0088294 A1 4/2009 West
2009/0105039 A1 4/2009 Sah
2009/0105896 A1 4/2009 Tamai
2009/0105898 A1 4/2009 Wu
2009/0105914 A1 4/2009 Buur
2009/0107745 A1 4/2009 Buur
2009/0107755 A1 4/2009 Kothari
2009/0108673 A1 4/2009 Wang
2009/0111637 A1 4/2009 Day
2009/0111640 A1 4/2009 Buur
2009/0111642 A1 4/2009 Sah
2009/0111643 A1 4/2009 Sah
2009/0111644 A1 4/2009 Kaminsky
2009/0111645 A1 4/2009 Heap
2009/0112385 A1 4/2009 Heap
2009/0112392 A1 4/2009 Buur
2009/0112399 A1 4/2009 Buur
2009/0112412 A1 4/2009 Cawthorne
2009/0112416 A1 4/2009 Heap
2009/0112417 A1 4/2009 Kaminsky
2009/0112418 A1 4/2009 Buur
2009/0112419 A1 4/2009 Heap
2009/0112420 A1 4/2009 Buur
2009/0112421 A1 4/2009 Sah
2009/0112422 A1 4/2009 Sah
2009/0112423 A1 4/2009 Foster
2009/0112427 A1 4/2009 Heap
2009/0112428 A1 4/2009 Sah
2009/0112429 A1 4/2009 Sah
2009/0112495 A1 4/2009 Center
2009/0115349 A1 5/2009 Heap
2009/0115350 A1 5/2009 Heap
2009/0115351 A1 5/2009 Heap
2009/0115352 A1 5/2009 Heap
2009/0115353 A1 5/2009 Heap
2009/0115354 A1 5/2009 Heap
2009/0115365 A1 5/2009 Heap
2009/0115373 A1 5/2009 Kokotovich
2009/0115377 A1 5/2009 Schwenke
2009/0115408 A1 5/2009 West
2009/0115491 A1 5/2009 Anwar
2009/0118074 A1 5/2009 Zettel
2009/0118075 A1 5/2009 Heap
2009/0118076 A1 5/2009 Heap
2009/0118077 A1 5/2009 Hsieh
2009/0118078 A1 5/2009 Wilmanowicz
2009/0118079 A1 5/2009 Heap
2009/0118080 A1 5/2009 Heap
2009/0118081 A1 5/2009 Heap
2009/0118082 A1 5/2009 Heap
2009/0118083 A1 5/2009 Kaminsky
2009/0118084 A1 5/2009 Heap
2009/0118085 A1 5/2009 Heap
2009/0118086 A1 5/2009 Heap
2009/0118087 A1 5/2009 Hsieh
2009/0118089 A1 5/2009 Heap
2009/0118091 A1 5/2009 Lahti
2009/0118093 A1 5/2009 Heap
2009/0118094 A1 5/2009 Hsieh
2009/0118877 A1 5/2009 Center
2009/0118879 A1 5/2009 Heap
2009/0118880 A1 5/2009 Heap
2009/0118882 A1 5/2009 Heap
2009/0118883 A1 5/2009 Heap
2009/0118884 A1 5/2009 Heap
2009/0118885 A1 5/2009 Heap
2009/0118886 A1 5/2009 Tamai
2009/0118887 A1 5/2009 Minarcin
2009/0118888 A1 5/2009 Minarcin
2009/0118901 A1 5/2009 Cawthorne
2009/0118914 A1 5/2009 Schwenke
2009/0118915 A1 5/2009 Heap
2009/0118916 A1 5/2009 Kothari
2009/0118917 A1 5/2009 Sah
2009/0118918 A1 5/2009 Heap
2009/0118919 A1 5/2009 Heap
2009/0118920 A1 5/2009 Heap
2009/0118921 A1 5/2009 Heap
2009/0118922 A1 5/2009 Heap
2009/0118923 A1 5/2009 Heap
2009/0118924 A1 5/2009 Heap
2009/0118925 A1 5/2009 Hsieh
2009/0118926 A1 5/2009 Heap
2009/0118927 A1 5/2009 Heap
2009/0118928 A1 5/2009 Heap
2009/0118929 A1 5/2009 Heap
2009/0118930 A1 5/2009 Heap
2009/0118931 A1 5/2009 Kaminsky
2009/0118932 A1 5/2009 Heap
2009/0118933 A1 5/2009 Heap
2009/0118934 A1 5/2009 Heap
2009/0118935 A1 5/2009 Heap
2009/0118936 A1 5/2009 Heap
2009/0118937 A1 5/2009 Heap
2009/0118938 A1 5/2009 Heap
2009/0118939 A1 5/2009 Heap
2009/0118940 A1 5/2009 Heap
2009/0118941 A1 5/2009 Heap

| | | | |
|---|---|---|---|
| 2009/0118942 | A1 | 5/2009 | Hsieh |
| 2009/0118943 | A1 | 5/2009 | Heap |
| 2009/0118944 | A1 | 5/2009 | Heap |
| 2009/0118945 | A1 | 5/2009 | Heap |
| 2009/0118946 | A1 | 5/2009 | Heap |
| 2009/0118947 | A1 | 5/2009 | Heap |
| 2009/0118948 | A1 | 5/2009 | Heap |
| 2009/0118949 | A1 | 5/2009 | Heap |
| 2009/0118950 | A1 | 5/2009 | Heap |
| 2009/0118951 | A1 | 5/2009 | Heap |
| 2009/0118952 | A1 | 5/2009 | Heap |
| 2009/0118954 | A1 | 5/2009 | Wu |
| 2009/0118957 | A1 | 5/2009 | Heap |
| 2009/0118962 | A1 | 5/2009 | Heap |
| 2009/0118963 | A1 | 5/2009 | Heap |
| 2009/0118964 | A1 | 5/2009 | Snyder |
| 2009/0118969 | A1 | 5/2009 | Heap |
| 2009/0118971 | A1 | 5/2009 | Heap |
| 2009/0118999 | A1 | 5/2009 | Heap |
| 2009/0144002 | A1 | 6/2009 | Zettel |

* cited by examiner

METHOD AND APPARATUS TO CONTROL ENGINE TEMPERATURE FOR A HYBRID POWERTRAIN

CROSS REFERENCE TO RELATED APPLICATIONS

This application claims the benefit of U.S. Provisional Application No. 60/985,983 filed on Nov. 7, 2007 which is hereby incorporated herein by reference.

TECHNICAL FIELD

This disclosure pertains generally to control systems for hybrid powertrain systems.

BACKGROUND

The statements in this section merely provide background information related to the present disclosure and may not constitute prior art.

Powertrain control systems, including hybrid powertrain architectures, operate to meet operator demands for performance, e.g., torque and acceleration. The operator demands for performance are balanced against other operator requirements and regulations, e.g., fuel economy and emissions. The balance of operator demands for performance against other operator requirements and regulations can be accomplished by quantifying engine power losses associated with specific operating conditions during ongoing operation.

Known systems to determine instantaneous engine power losses utilize pre-calibrated tables stored in on-board computers to determine losses based upon measured operating conditions during operation. Such systems consume substantial amounts of computer memory. The memory space is further compounded by engine operating modes, e.g., cylinder deactivation. Such systems are not able to accommodate variations in operating conditions, including engine warm-up and overtemperature.

SUMMARY

An internal combustion engine is connected to a transmission to transmit tractive power to a driveline. Engine coolant temperature is determined, and power output of the engine is adjusted based upon the coolant temperature and a preferred coolant temperature range. The transmission is controlled to transmit tractive power to the driveline to meet an operator torque request based upon the adjusted power output of the engine.

BRIEF DESCRIPTION OF THE DRAWINGS

One or more embodiments will now be described, by way of example, with reference to the accompanying drawings, in which.

DETAILED DESCRIPTION

Figure 1:
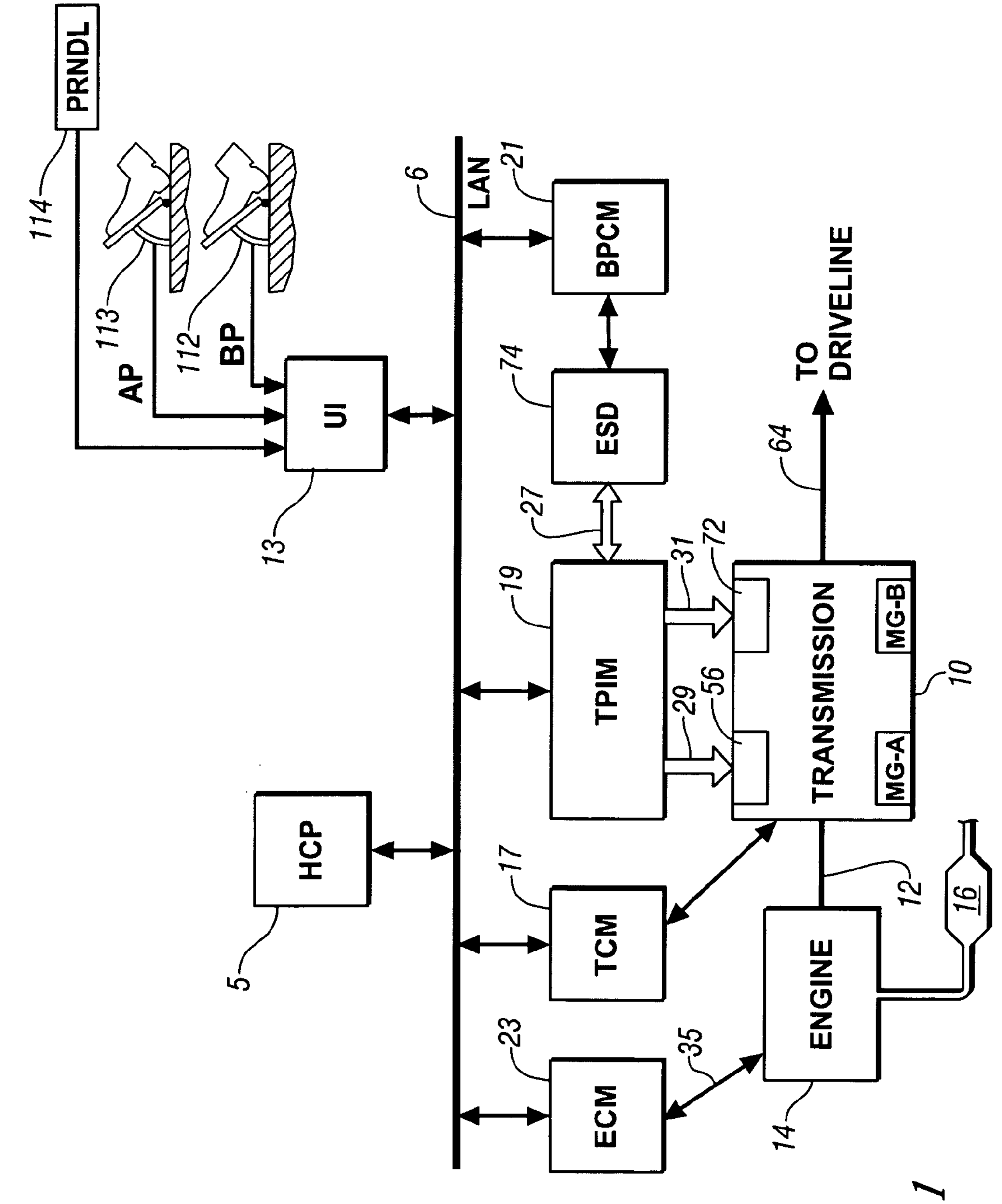
FIG. 1 is a schematic diagram of an exemplary architecture for a powertrain and a control system, in accordance with the present disclosure.

Referring now to the drawings, wherein the showings are for the purpose of illustrating certain exemplary embodiments only and not for the purpose of limiting the same, FIG. 1 depicts a schematic diagram of an exemplary powertrain and control system operative to execute control routines. The powertrain comprises an internal combustion engine 14 and first and second electric machines ('MG-A') 56 and ('MG-B') 72. The internal combustion engine 14 and the first and second electric machines 56 and 72 each generate power transmitted via the transmission 10 to an output member 64, e.g., a driveline for a vehicle (not shown). The power generated by the engine 14 and the first and second electric machines 56 and 72 and transmitted to the transmission 10 is characterized and described in terms of input torques, referred to herein as Ti, $T_A$, and $T_B$, respectively, and speed, referred to herein as Ni, $N_A$, and $N_B$, respectively.

The exemplary engine 14 comprises a multi-cylinder internal combustion engine selectively operative in several states to transmit power to the transmission via an input member 12, e.g., a rotating shaft. The engine 14 can be either a spark-ignition or a compression-ignition engine. The engine 14 includes a crankshaft operatively coupled to the input member 12 of the transmission 10. A rotational speed sensor monitors rotational speed of the input member 12. The engine is monitored and controlled by an engine control module 23 (hereafter 'ECM'). An engine operating point, comprising an engine rotational speed, $N_E$, and an output torque, $T_E$, is indicative of power output of the engine. The engine operating point can differ from the input speed, Ni, and the input torque, Ti, to the transmission 10 due to placement of torque-consuming components on the input shaft 12 between the engine 14 and the transmission 10, e.g., a hydraulic pump and/or a torque management device.

The engine 14 is fluidly connected to an exhaust aftertreatment system 16 comprising one or more devices adapted to oxidize and/or reduce (i.e. convert) engine exhaust gas feedstream constituents and/or trap and combust particulate matter. Exemplary exhaust gas feedstream constituents of interest can include hydrocarbons (hereafter 'HC'), carbon monoxide (hereafter 'CO'), nitrides of oxygen (hereafter '$NO_X$'), and particulate matter (hereafter 'PM'). The device(s) of the exhaust aftertreatment system 16 are configured to operate within conditions characterized by a preferred temperature range and a preferred flow rate over which conversion efficiency of one or more of HC, CO, NOx, and PM can be optimized. When the exhaust aftertreatment system 16 is exposed to and operates at temperatures that are below the preferred temperature range, one result can include reduced conversion efficiency for the exhaust gas constituents, including oxidation of HC and CO, reduction of NOx, and combustion of PM. When the exhaust aftertreatment system 16 is exposed to and achieves temperatures that are greater than the preferred temperature range, one result can include thermal damage.

Engine operation is described in terms of the engine operating point, engine operating modes, and engine states in which the engine can be selectively operated. The engine operating modes include air/fuel ratio operation at one of a stoichiometric operating mode and a rich operating mode. The air/fuel ratio operation may additionally include a lean operating mode, e.g., when the engine is a operating as a compression-ignition engine. or the engine is a spark-ignition engine operating in a controlled auto-ignition combustion mode. The engine operating modes also include engine temperature management comprising a catalyst warm-up mode and a warmed-up catalyst mode, which can be based upon temperature of the exhaust aftertreatment system 16, discussed in further detail with reference to FIGS. 3A and 3B.

The engine warm-up mode includes engine operating control routines comprising retarding spark ignition timing (when the engine comprises a spark-ignition engine) or retarding fuel injection timing (when the engine comprises a compression-ignition engine) during engine operation after starting to increase combustion heat generated by the engine. The increased heat generated during combustion can be transferred to the aftertreatment system 16. The engine states comprise a normal engine state and a cylinder deactivation state. In the normal engine state, all the engine cylinders are fueled and fired. In the cylinder deactivation state, typically half of the cylinders, e.g., one bank of a V-configured engine, are deactivated. A bank of cylinders is typically deactivated by discontinuing fuel injection thereto and deactivating valves.

The first and second electric machines 56 and 72 each comprises a three-phase AC electric machine having a rotor rotatable within a stator. An electrical energy storage device (hereafter 'ESD') 74 is high voltage DC-coupled to a transmission power inverter module (hereafter 'TPIM') 19 via DC transfer conductors 27. The TPIM 19 is an element of the control system.

The exemplary transmission 10 preferably comprises a device including the input member 12 operatively coupled to the crankshaft of the engine 14, one or more planetary gear sets, one or more torque-transmitting devices (e.g. clutches, brakes), and the output member 64. The stators of each of the first and second electric machines 56 and 72 are grounded to a case of the transmission 10, and the rotors are operatively coupled to rotating elements of the planetary gear sets to transmit torque thereto. An element of one of the planetary gear sets is operatively coupled to the input member 12, and an element of one of the planetary gear sets is operatively coupled to the output member 64. The transmission 10 receives input power from the torque-generative devices, including the engine 14 and the first and second electric machines 56 and 72 as a result of, respectively, energy conversion from fuel or electrical potential stored in the ESD 74.

The control system described herein comprises a subset of an overall vehicle control architecture, and provides coordinated system control of the exemplary powertrain. The control system synthesizes pertinent information and inputs, and executes algorithms to control various actuators to achieve control targets of, for example, fuel economy, emissions, performance, driveability, and protection of hardware, including batteries of ESD 74 and the first and second electric machines 56 and 72. The distributed control module system includes the ECM 23, a transmission control module (hereafter 'TCM') 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and, a vehicle speed cruise control (not shown). The transmission gear selector 114 may have a discrete number of operator-selectable positions to enable one of a forward and a reverse direction of the output member 64.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 monitors engine operating conditions, comprising monitoring inputs from various engine sensing devices and engine operation to determine engine speed (RPM), engine load (Brake Torque, N-m), barometric pressure, and engine coolant temperature. Engine sensing devices operative to monitor engine operating conditions comprise a crankshaft sensor from which the ECM 23 determines the engine speed, $N_E$ (RPM), and a mass air flow sensor, from which the ECM is operative to determine the engine torque, $T_E$, or load (e.g., NMEP in N-m). Alternatively, the engine load can be determined from monitoring operator input to the accelerator pedal 113. Engine sensing devices further include a coolant temperature sensor from which the ECM 23 monitors engine temperature, and an exhaust gas sensor from which the ECM 23 monitors the exhaust gas feedstream, e.g., air/fuel ratio, temperature, or exhaust constituents. The ECM 23 monitors engine operating conditions, including the engine speed (RPM), the load (brake torque or NMEP in N-m), barometric pressure, coolant temperature, and the exhaust gas, e.g., air/fuel ratio. The engine air/fuel ratio can be measured directly with a sensor or estimated based upon engine operating conditions. The ECM 23 is operative to estimate a temperature of the catalyst 16 based upon the engine operating conditions. Alternatively, one or more temperature sensing devices can be adapted to monitor temperature of one of the elements of the exhaust aftertreatment system 16. The ECM 23 generates and communicates command signals to control engine actuators, including, e.g., fuel injectors, ignition modules, and throttle control modules.

The TCM 17 is operably connected to the transmission 10 and functions to acquire data from a variety of sensors and provide command signals to the transmission 10, including monitoring inputs from pressure switches and selectively actuating pressure control solenoids and shift solenoids to actuate clutches to achieve various transmission operating modes. The BPCM 21 is signally connected to one or more sensors operative to monitor electrical current or voltage parameters of the ESD 74 to provide information about the state of the batteries to the HCP 5. Such information includes battery state-of-charge ('SOC'), battery voltage, amp-hour throughput, and available battery power.

The TPIM 19 transmits electrical power to and from the first electric machine 56 by transfer conductors 29, and the TPIM 19 similarly transmits electrical power to and from the second electric machine 72 by transfer conductors 31 in response to motor torque commands for the first and second electric machines 56 and 72. Electrical current is transmitted to and from the ESD 74 in accordance with whether the ESD 74 is being charged or discharged. TPIM 19 includes a pair of power inverters and respective motor control modules configured to receive motor control commands and control inverter states therefrom for providing motor drive or regeneration functionality.

Each of the aforementioned control modules preferably comprises a general-purpose digital computer generally including a microprocessor or central processing unit, storage mediums comprising random access memory, non-volatile memory, e.g., read only memory and electrically programmable read only memory, a high speed clock, analog to digital and digital to analog conversion circuitry, and input/output circuitry and devices and appropriate signal conditioning and buffer circuitry. Each control module has a set of control algorithms, comprising machine-executable code and calibrations resident in the read only memory and executable to provide the respective functions of each control module. Each of the aforementioned control modules communicates with other control modules, sensors, and actuators via a local area network (hereafter 'LAN') bus 6. The LAN bus 6 allows for structured communication of control parameters and commands between the various control modules. The specific communication protocol utilized is application-specific. The LAN bus 6 and appropriate protocols provide for robust messaging and multi-control module interfacing between the aforementioned control modules, and other control modules providing functionality such as antilock brakes, traction control, and vehicle stability.

Algorithms for control and state estimation in each of the control modules can be executed during preset loop cycles such that each algorithm is executed at least once each loop cycle. Algorithms stored in the non-volatile memory devices are executed by respective ones of the central processing units and monitor inputs from the sensing devices and execute control and diagnostic routines to control operation of the respective devices using preset calibrations. Loop cycles are executed at regular intervals, for example each 3.125, 6.25, 12.5, 25, 50 and 100 milliseconds during ongoing engine and vehicle operation. Alternatively, algorithms may be executed in response to occurrence of an event.

During an engine operating cycle, i.e., a period of engine operation from an engine start to a subsequent engine stop, the control modules execute control routines to monitor and control the engine 14, including controlling the engine 14 and the electro-mechanical transmission 10 to minimize a total energy loss by optimizing a total power loss while managing temperatures of the engine 14 and the exhaust aftertreatment system 16. This comprises executing control routines to monitor ambient operating conditions, the engine operating conditions, and powertrain operating conditions. The ambient operating conditions comprise an ambient temperature and a barometric pressure, preferably monitored with sensing devices on the vehicle. Vehicle operation is monitored. The control routine includes algorithms in the form of machine-executable code preferably stored in the non-volatile memory device of one of the control modules, e.g., the HCP 5. The HCP 5 executes a control routine that estimates a future energy loss for the engine operating cycle, and determines a current power loss and a time-rate of change in the estimated future energy loss for the engine operating cycle over ranges of the engine operation.

The current total power loss ('$P_{LOSS\_TOT}$') includes power losses through the electro-mechanical transmission 10 and the first and second electric machines 56 and 72, also referred to herein as $P_{LOSS\_OTHER}$, and the engine power loss, also referred to herein as $P_{LOSS\_ENG}$. The engine power loss comprises an estimate of the power loss for the engine 14 at that period in time, at the current engine operation, under the current engine operating conditions. This includes monitoring and determining the engine operating conditions and the engine operation to determine an instantaneous power loss, comprising a nominal engine power loss ('$P_{LOSS\_ENG\_NOM}$') for the engine operating point and a power loss correction $AP_{LOSS\_ENG}$. The nominal engine power loss, $P_{LOSS\_ENG\_NOM}$, is determined using Eq. 1 set forth below.

$$P_{LOSS\_ENG\_NOM} = \dot{m}_{EMISS} \times \left(\frac{P_{ENG}}{\dot{m}_{EMISS}}\right)_{MAX} - P_{ENG} \quad [1]$$

wherein $\dot{m}_{EMISS}$ comprises the rate of emissions generated, e.g., grams of hydrocarbon for the current engine operating conditions. The term $$\left(\frac{P_{ENG}}{\dot{m}_{EMISS}}\right)_{MAX}$$

is a constant term, derived for a specific engine design, representing a maximized engine power for a rate of emissions generation, e.g., KW-s per gram of hydrocarbon, (kW/(g/s)). An engine power term, $P_{ENG}$, comprises the actual power produced by the engine. The difference between the two terms determines the nominal engine power loss, $P_{LOSS\_ENG\_NOM}$.

System optimization for emissions performance is balanced against operation to warm-up the engine 14 and to manage the temperature of the exhaust aftertreatment system 16, to achieve a minimum total energy loss over the engine operating cycle. To minimize fuel consumption and exhaust emissions over the engine operating cycle, the optimization routine determines the future energy loss during the cycle.

The future energy loss, also referred to herein as $E_{LOSS\_FUTURE}$, comprises the amount of energy required to complete the engine operating cycle based upon what the present operating conditions as shown by Eq. 2 set forth below.

$$E_{LOSS\_FUTURE} = \int_t^{t_{MAX}} P_{LOSS\_TOT}\,dt \quad [2]$$

The limits on the integral range from current time, t, to a maximum time, $t_{MAX}$ during the engine operating cycle. During operation, as time t increases, the value of the integral decreases, i.e., less energy is required to warm up to the preferred temperature range.

Minimizing the total energy loss comprises operating the engine 14 to minimize the energy loss during the remainder of the engine operating cycle, e.g., until temperature of the exhaust aftertreatment system 16 reaches the preferred temperature range. The optimization described herein is based upon the total system power loss. The total system power loss includes predetermined calibrations that prevent overcharging the ESD 74 and determine costs for using the first and second electric machines 56 and 72. This allows the system to change engine load based on the operator torque request.

Eq. 2 can be rewritten to express the future energy loss as follows, in Eq. 3 set forth below.

$$E_{LOSS\ FUTURE}(t,T_{CAT}) = P_{LOSS\ TOT}(t,T_{CAT}) \times \Delta t + E_{LOSS\ FUTURE}(t+\Delta t, T_{CAT}+\Delta T_{CAT}) \quad [3]$$

wherein $T_{CAT}$ comprises the temperature of the catalyst 16. This can be reduced to Eq. 4 as set forth below.

$$\frac{(-\Delta E_{LOSS\ FUTURE})_{T_{CAT}=Const}}{\Delta t} = P_{LOSS\_TOT} + \frac{(\Delta E_{LOSS\ FUTURE})_{t+\Delta t}}{\Delta t} \quad [4]$$

Minimizing the total energy loss can be accomplished by minimizing the power loss and the rate of change in the future energy loss. The derivation of Eq. 4, above, can be expressed in continuous form as partial derivatives, as set forth below in Eq. 5.

$$-\frac{\partial E}{\partial t} = P_{LOSS\_TOT} + \frac{\partial E}{\partial T_{COOL}} \cdot \frac{dT_{COOL}}{dt} + \frac{\partial E}{\partial T_{CAT}} \cdot \frac{dT_{CAT}}{dt} \quad [5]$$

wherein the partial derivatives are derived for changes in energy based upon coolant temperature and based upon temperature of the exhaust aftertreatment system 16.

The $$\frac{\partial E}{\partial T_{CAT}}$$

term comprises a precalibrated factor stored as an array in memory and is determined based upon engine operating time and catalyst temperature ranging from cold, e.g., 0° C. to warmed up, e.g., 600° C. The $$\frac{\partial E}{\partial T_{COOL}}$$

term comprises a precalibrated factor stored as an array in memory and determined as a function of engine operating time and coolant temperature, using discrete coolant temperatures, ranging from cold, e.g., −30° C., to warmed up, e.g., 90° C. The calibration values for the engine 14 are preferably developed using a standardized engine and vehicle test procedure. The term $$\frac{dT_{CAT}}{dt}$$

comprises a precalibrated polynomial equation for a change in temperature of the exhaust aftertreatment system 16 based upon time for the specific vehicle and system application. There is a plurality of polynomial equations for the $$\frac{dT_{CAT}}{dt}$$

term, selected during ongoing operation based upon the engine states comprising the normal engine state and the cylinder deactivation state. Furthermore, there are polynomial equations developed for discrete catalyst temperatures, ranging from cold, e.g., 0° C., to warmed up, e.g., 600° C., and above. The polynomial equations are preferably developed using heat rejection data and a thermal model of the engine 14 to predict warm-up rate of the exhaust aftertreatment system 16. The rate of change in the estimated future energy loss during the catalyst warm-up mode is determined by calculating the rate of change in the future energy loss based upon Eq. 5, above, and determining an engine operating point that comprises a minimum system power loss, $P_{LOSS\_FINAL}$, or $$-\frac{\partial E}{\partial t},$$

based upon a combination of instantaneous power loss and rate of change in the future energy loss.

The nominal engine power loss, $P_{LOSS\_ENG\_NOM}$, is determined based upon the engine operating point. The nominal engine power loss is preferably determined during each 50 millisecond engine loop cycle, from a predetermined calibration table, determined for the engine 14 operating over a range of engine speed and load conditions under nominal engine operating conditions for temperature, barometric pressure and stoichiometric air/fuel ratio. The emissions power loss is evaluated using a nine-term polynomial equation with a correction based upon temperature of the exhaust aftertreatment system 16 and engine coolant temperature, as described herein. To accurately evaluate the nominal engine power loss, emissions generation estimated across all speeds and loads across an allowable range of engine operating conditions. Changes in coolant temperature or barometric pressure can significantly affect the estimated fuel consumption. To account for changes in the nominal engine power loss due to engine operation at non-standard engine operating conditions, the engine power loss correction, $\Delta P_{LOSS\ ENG}$, is added to the nominal engine power loss $P_{LOSS\ ENG}$, as depicted and described in Eq. 15, hereinbelow.

The engine power loss correction, $\Delta P_{LOSS\ ENG}$ is calculated based upon the ambient operating conditions and the engine operating conditions. A plurality of polynomial equations are reduced to program code and ongoingly executed to calculate the power loss correction and the future energy loss correction, based upon the engine operating conditions, the engine operation, and the ambient operating conditions, as described herein. The power loss correction is determined based upon the input speed Ni and the input torque Ti. Each power loss correction and future energy loss correction is determined with reference to Eq. 6 set forth below.

$$\Delta P_{LOSS\ ENG} = C0 + C1 \times Ti + C2 \times Ti^2 + C3 \times Ni + C4 \times Ni \times Ti + C5 \times Ni \times Ti^2 + C6 \times Ni^2 + C7 \times Ni^2 \times Ti + C8 \times Ni^2 Ti \quad [6]$$

The engine power loss correction, $\Delta P_{LOSS\ ENG}$, comprises a sum of a plurality of polynomial equations described with reference to Eqs. 7-14, as follows.

A power loss related to supplemental fuel necessary for stable engine operation under the current operating conditions is preferably calculated using Eq. 7, as set forth below.

$$\beta_1(t, T_{CAT}) \times \left[\dot{m}_{FUEL} \times \left(\frac{P_{ENG}}{\dot{m}_{FUEL}}\right)_{MAX} - P_{ENG}\right] \quad [7]$$

wherein $\dot{m}_{FUEL}$ is the fuel flow rate, and $$\left(\frac{P_{ENG}}{\dot{m}_{FUEL}}\right)_{MAX}$$

is the maximum power for the fuel flow rate for the engine 14, $T_{CAT}$ comprises temperature of the catalyst 16, and t comprises elapsed time for the current engine operating cycle.

A power loss related to fueling to optimize HC emissions is preferably calculated using Eq. 8, as set forth below.

$$\beta_2(t, T_{CAT}) \times \left[\dot{m}_{HC\ EMIS} \times \left(\frac{P_{ENG}}{\dot{m}_{HC\ EMIS}}\right)_{MAX} - P_{ENG}\right] \quad [8]$$

wherein $\dot{m}_{HC\ EMIS}$ is a fuel flow rate for HC emissions, and $$\left(\frac{P_{ENG}}{\dot{m}_{HC\ EMIS}}\right)_{MAX}$$

is the maximum power for the fuel flow rate for optimized HC emissions for the engine 14.

A power loss related to fueling to optimize $NO_X$ emissions is preferably calculated using Eq. 9, as set forth below.

$$\beta_3(t, T_{CAT}) \times \left[\dot{m}_{NOx\ EMIS} \times \left(\frac{P_{ENG}}{\dot{m}_{NOx\ EMIS}}\right)_{MAX} - P_{ENG}\right] \quad [9]$$

wherein $\dot{m}_{NOx\ EMIS}$ is a fuel flowrate for NOx emissions, and $$\left(\frac{P_{ENG}}{\dot{m}_{NOx\ EMIS}}\right)_{MAX}$$

is a maximum power for the fuel flow rate for optimized NOx emissions for the engine 14.

The future energy loss related to fueling to effect coolant and engine oil warm-up is preferably calculated using Eq. 10, as follows:

$$\beta_4(t, T_{CAT}) \times \frac{dE_{FUEL}(t, T_{COOL})}{dT_{COOL}} \times \frac{dT_{COOL}(Ni, Ti, T_{COOL})}{dt} \quad [10]$$

The future energy loss related to fueling to effect warm-up of the exhaust aftertreatment system 16 for HC emissions performance is preferably calculated using Eq. 11, as set forth below.

$$\beta_5(t, T_{CAT}) \times \frac{dE_{HC}(t, T_{CAT})}{dT_{CAT}} \times \frac{dT_{CAT}(Ni, Ti, T_{CAT})}{dt} \quad [11]$$

The future energy loss related to fueling to effect warm-up of the exhaust aftertreatment system 16 for NOx emissions performance is preferably calculated using Eq. 12, as set forth below.

$$\beta_6(t, T_{CAT}) \times \frac{dE_{NOx}(t, T_{CAT})}{dT_{CAT}} \times \frac{dT_{CAT}(Ni, Ti, T_{CAT})}{dt} \quad [12]$$

The future energy loss related to fueling to manage the exhaust aftertreatment system 16 temperature is preferably calculated using Eq. 13, as set forth below.

$$\beta_7(t, T_{CAT}) \times \frac{dT_{CAT}(Ni, Ti, T_{CAT})}{dt} \quad [13]$$

The future energy loss related to fueling to manage engine temperature, including preventing engine over-temperature operation is preferably calculated using Eq. 14, as set forth below.

$$\beta_8(t, T_{CAT}, T_{COOL}) \times \frac{dT_{COOL}(Ni, Ti, T_{COOL})}{dt} \quad [14]$$

The terms in Eqs. 7-14 are precalibrated and stored as arrays one of the memory devices of the HCP 5, based upon the engine and ambient operating conditions and the engine operation. The term $T_{COOL}$ comprises the coolant temperature. The terms $E_{FUEL}$, $E_{HC}$, and $E_{NOX}$ comprise energy losses related to supplemental fueling for HC and NOx emissions performance. The terms $$\frac{dT_{COOL}(Ni, Ti, T_{COOL})}{dt} \text{ and } \frac{dT_{CAT}(Ni, Ti, T_{CAT})}{dt}$$

comprise precalibrated time-based changes in temperatures that vary with the input speed, torque, and corresponding temperature. The terms $$\frac{dE_{HC}(t, T_{CAT})}{dT_{CAT}} \text{ and } \frac{dE_{NOx}(t, T_{CAT})}{dT_{CAT}}$$

are precalibrated changes in energy based upon the temperature of the exhaust aftertreatment system 16 that vary with elapsed time, t, and the temperature of the exhaust aftertreatment system 16, and are preferably based on off-line energy loss calculations. The term $$\frac{dT_{COOL}(Ni, Ti, T_{COOL})}{dt}$$

comprises a time-rate change in coolant temperature based upon speed, load, and the coolant temperature.

The coefficients $\beta_1$-$\beta_8$ comprise weighting factors for the power loss equations, i.e., Eqs. 7-14, and are determined for the range of elapsed engine run times t for the engine operating cycle, and temperature, $T_{CAT}$, of the exhaust aftertreatment system 16 and coolant temperature, $T_{COOL}$. The coefficients $\beta_1$-$\beta_8$ are preferably calibrated and evaluated using a least squares curve fit using engine data. The coefficients $\beta_1$-$\beta_8$ are stored in calibration tables within one of the memory devices for various operating conditions and retrievable during ongoing engine operation. Preferably, the coefficients are calibrated such that $\beta_1+\beta_2+\beta_3=1$, $\beta_4+\beta_5+\beta_6=1$, $\beta_1=\beta_4$, $\beta_2=\beta_5$, and $\beta_3=\beta_6$. As described hereinbelow with reference to FIGS. 3A and 3B, the $\beta_7$ coefficient comprises a predetermined calibration for controlling engine operation to manage the temperature of the exhaust aftertreatment system 16. The $\beta_8$ term is a calibration term used to manage engine operation (speed and load) to manage coolant temperature. Managing the coolant temperature using this method precludes a need to operate the engine 14 under non-optimum spark advance conditions or non-optimum fuel injection timing conditions to manage engine temperature. Linear interpolation is used to determine the coefficients when the operating conditions are between table values.

Each of Eqs. 7-14 is executed in a form of Eq. 6, with specifically calibrated coefficients C0-C8, and the input speed, Ni, and the input torque, Ti. The coefficients C0-C8 for each of Eqs. 7-14 are preferably calibrated and evaluated using a least squares curve fit derived using engine data generated over the ranges of input speeds, Ni, and load, Ti, during engine operation in the engine states and the operating modes. Thus, a set of coefficients C0-C8 are generated for the air/fuel ratio operating modes comprising each of the stoichiometric and the rich operating modes, e.g., an air/fuel ratio equivalence of 1.0 and 0.7, and for each of the engine temperature management modes comprising the warm-up and the warmed up modes. A set of coefficients C0-C8 are further generated for each of the normal engine state and the cylinder deactivation state. A set of coefficients C0-C8 are further derived for each of a standard and a low barometric pressure, e.g., 100 kPa and 70 kPa. The aforementioned sets of coefficients C0-C8 can be stored in arrays within one of the memory devices for each of the operating modes and engine states, for retrieval during ongoing operation. As described, there are eight sets of coefficients C0-C8 generated and stored. The addition of the polynomial equations for the engine power loss reflected in Eqs. 7-14 results in the power loss correction to the standard power loss calculation.

The polynomial coefficients C0-C8 are evaluated for each of Eqs. 7-14 during ongoing operation and then added to generate a single set of coefficients C0-C8 for use with Eq. 6, and updated at a relatively slow rate of once per second. The $\beta_1$-$\beta_8$ weighting factors determine the weighting between the different types of engine power loss, as described hereinbelow. The final polynomial equation is evaluated hundreds of times every second as an element of torque optimization routines. Determining a power loss at a specific engine operating condition can comprise determining power loss using equations described herein and interpolating therebetween to determine power loss at the real-time operating conditions.

The control routine determines the total engine power loss by summing the nominal power loss and power loss correction, as set forth below in Eq. 15.

$$P_{LOSS\_ENG\_TOT}=P_{LOSS\ ENG}+P\Delta_{LOSS\ ENG} \quad [15]$$

The nominal engine power loss is determined as described in Eq. 1, and the power loss correction is determined as described in Eq. 6 with coefficients C0-C8 determined by combining results from Eqs. 7-14, determined based upon the current engine operation and the engine and ambient operating conditions, as previously described. This operation permits including complex engine power loss characteristics to calculate a single engine power loss. The final C0-C8 coefficients to the polynomial equation of Eq. 6 are determined based on precalibrated factors and the $\beta_1$-$\beta_8$ weighting factors. This determination of the coefficients C0-C8 can be performed at a relatively slow update rate, e.g., once per second. The final polynomial equation is used in the optimization routine numerous times before the next update.

Thus, the total power loss $P_{LOSS\_TOT}$ can be determined as set forth below in Eq. 16.

$$P_{LOSS\_TOT}=P_{LOSS\ ENG}+\Delta P_{LOSS\ ENG}+P_{LOSS\_OTHER} \quad [16]$$

Figure 2:
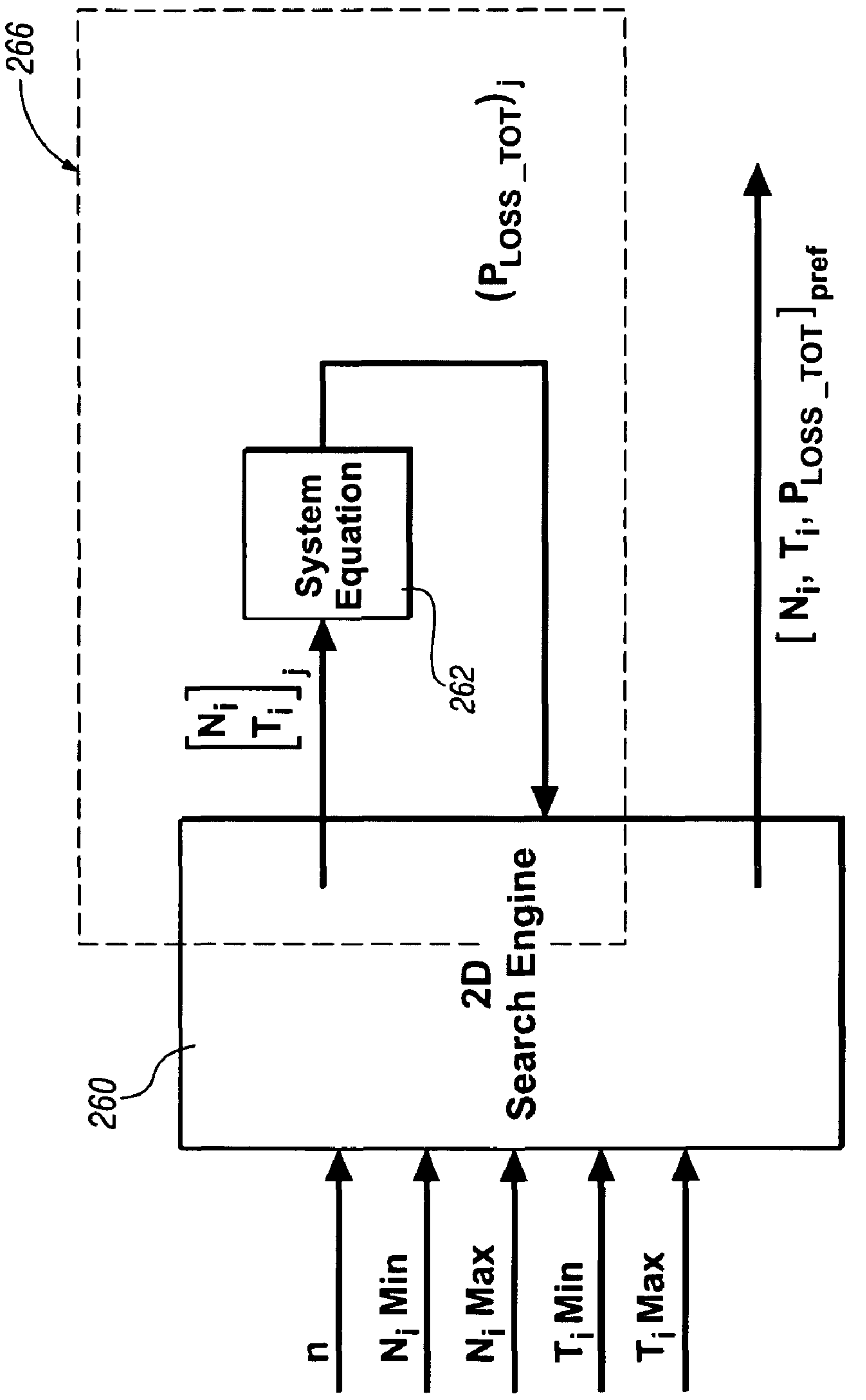
FIG. 2 is a schematic depiction, in accordance with the present disclosure.

Referring now to FIG. 2, a minimization routine is depicted for determining the minimum total power loss, $P_{LOSS\_TOT}$ to minimize the total energy loss. The minimization routine is executed to determine a preferred engine operation to minimize the total power loss. The minimization routine preferably comprises execution of a two-dimensional search engine 260 that has been encoded in the HCP 5. The two-dimensional search engine 260 iteratively generates engine operating points ranging across allowable engine operating points. The engine operating points comprise the input speed and input torque ('$[Ni/Ti]_j$') and the ranges are within minimum and maximum input speeds and input torques ('NiMin', 'NiMax', 'TiMin', 'TiMax'). The minimum and maximum input speeds and input torques can comprise achievable input speeds and input torques, e.g., from engine idle operation to engine red-line operation, or may comprise a subset thereof wherein the ranges are limited for reasons related to operating characteristics such as noise, vibration, and harshness.

The generated engine operating points $[Ni, Ti]_j$ are used in an iterative loop 266. The subscript "j" refers to a specific iteration, and ranges in value from 1 to n. The quantity of iterations n can be generated by any one of a number of methods, either internal to the search engine, or as a part of the overall method. The iterative loop 266 comprises inputting each of the generated engine operating points $[Ni, Ti]_j$ to a system equation 262, from which a value for the total power loss $(P_{LOSS\_TOT})_j$ is determined for the specific iteration. The system equation 262 comprises an algorithm that executes Eq. 16, above. In the engine operating cycle when it is determined that the temperature of the exhaust aftertreatment system 16 is below the preferred temperature range, e.g., during a cold-start, $\beta_2=1$ as used in Eq. 8, and $\beta_1=0$ and $\beta_3=0$, $\beta_5=1$, and $\beta_4=0$ and $\beta_6=0$, and a set of the coefficients C0-C8 are derived as described hereinabove.

The total power loss $(P_{LOSS\_TOT})_j$ determined for the specific iteration is returned and captured, or analyzed, in the two-dimensional search engine 260 depending upon specifics thereof. The two-dimensional search engine 260 iteratively evaluates values for the total power loss, $(P_{LOSS\_TOT})_j$ and selects new values for the engine operating points [Ni, Ti] based upon feedback to search for a minimum total power loss. The two-dimensional search engine 260 identifies preferred values for the engine operating points [Ni, Ti] at a preferred power loss, i.e., a minimum total power loss, $(P_{LOSS\_TOT})_j$ derived from all the iteratively calculated values. The preferred total power loss and corresponding values for input speed and input torque, $[Ni, Ti, P_{LOSS\_TOT}]_{pref}$, are output from the HCP 5 to the ECM 23. The ECM 23 converts the preferred input speed and input torque $[Ni, Ti]_{pref}$ to a corresponding engine operating point comprising engine speed and torque $[N_E, T_E]_{pref}$ that the ECM 23 uses to control operation of the engine 14.

As previously mentioned, there is a plurality of executable power loss correction polynomial equations. There are preferably eight sets of polynomial equations, derived for combinations of engine operation comprising: air/fuel ratio control modes of rich and stoichiometric, i.e., an air/fuel equivalence ratio of about 0.7 (rich) and 1.0 (stoichiometry); the normal engine state and the cylinder deactivation state; and engine operating temperature comprising the warm-up mode and the warmed-up mode, i.e., coolant temperature at or about 90° C. In operation, the engine system monitors ongoing operation, including engine speed (RPM), load (brake torque or NMEP in N-m), barometric pressure, coolant temperature, and air/fuel ratio.

Figure 3:
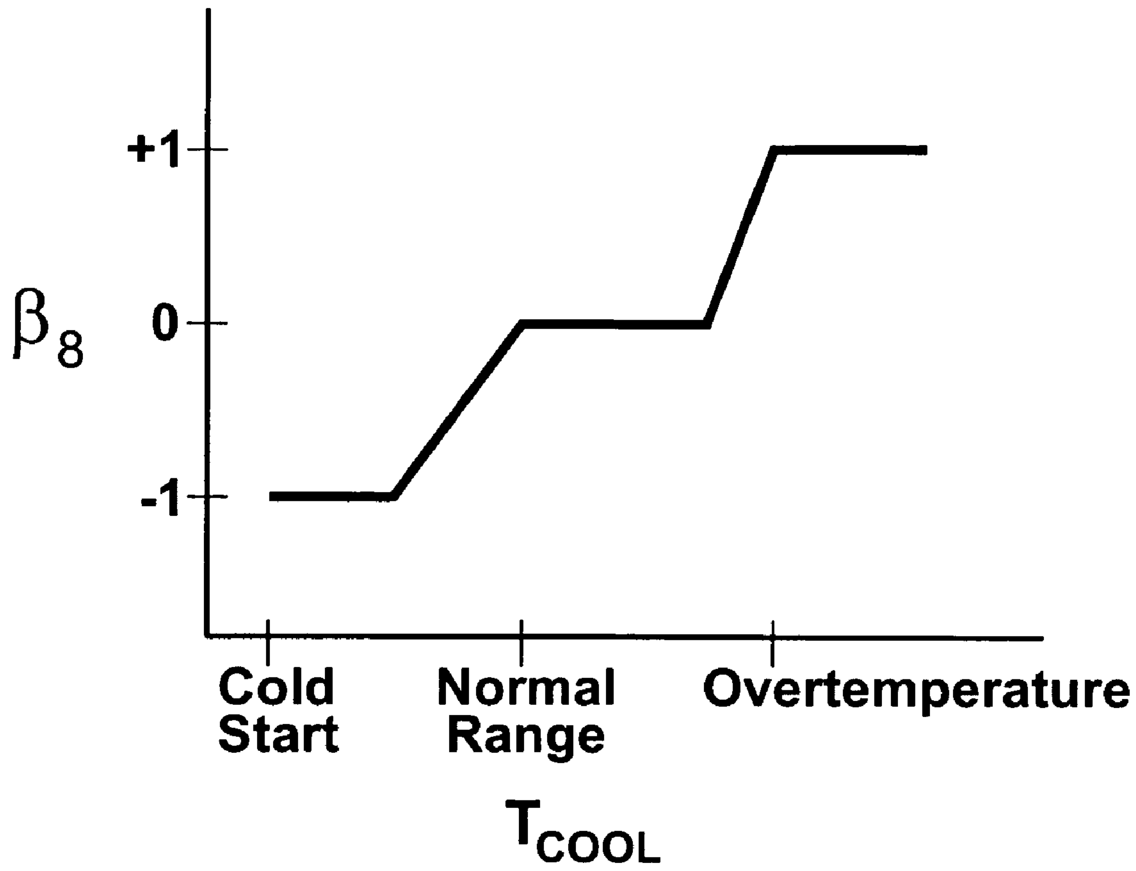
FIG. 3 is graphical data, in accordance with the present disclosure.

FIG. 3 shows predetermined calibration values for the $\beta_8$ term based upon the coolant temperature $T_{COOL}$. This includes reducing the engine output power when the coolant temperature is above a preferred coolant temperature range or threshold and increasing the engine output power when the coolant temperature is below the preferred coolant temperature range or threshold. The $\epsilon_8$ term is used in Eq. 14, above. Values for the $\beta_8$ term range from −1 for a cold start operation ('Cold Start'), normal operation, e.g., between 30° C. to 90° C., ('Normal Operation'), and +1 for overtemperature operation that can affect engine operating stability, e.g., greater than 90° C. ('Overtemperature').

During each engine operating cycle, the HCP 5 executes the control routines to monitor and control the engine 14 and the transmission 10 to minimize total energy loss by optimizing the total power loss while effecting warm-up of the engine 14 and managing temperature of the exhaust aftertreatment system 16. When the control routine determines that the coolant temperature is below a preferred coolant temperature, e.g., during a cold start operating cycle, the control routine identifies a preferred engine operation to achieve the preferred coolant temperature while minimizing the total energy loss. Operation of the engine 14 is controlled to achieve the preferred coolant temperature, preferably within a temperature range between 30° C. to 90° C. The electro-mechanical transmission 10 is controlled to achieve the tractive power comprising a torque and speed output through the output member 64 based upon the preferred engine operation and the operator torque request, among other factors. The preferred engine operation to achieve the preferred coolant temperature and minimize the total energy loss includes estimating the future energy loss and determining the power loss and the rate of change in the estimated future energy loss, and determining the preferred engine operation to minimize the power loss and the rate of change in the estimated future energy loss.

The overall strategy comprises adjusting operation of the engine 14 in a manner that increases the coolant temperature when it is relatively cool, and adjusting operation of the engine 14 in a manner that decreases the coolant temperature when it is relatively high. Thus, during a cold start and a warm-up operation the $\beta_8$ term is negative. The engine operating point, in terms of the input speed and torque Ni and Ti, can be adjusted to increase the coolant temperature. The overall tractive power output from the hybrid powertrain remains unchanged during the operation of the engine 14 to increase the coolant temperature. However, the control system can channel a portion of the engine output power into one of the first and second electric machines 56 and 72 for electric charging and increasing a state of charge of the ESD 74. The $\beta_8$ term increases when the control system determines that the coolant temperature has achieved a normal range, e.g., between 30° C. and 90° C. When the exhaust aftertreatment system 16 reaches the preferred temperature range, the $\epsilon_8$ term is maintained at or near zero and the engine operation is controlled for minimum power loss and optimum fuel economy. When it is determined that the engine coolant temperature is outside the preferred temperature range, e.g., greater than 90° C., the $\beta_8$ term is adjusted positively to adjust the engine operating point, i.e., the input speed and torque Ni and Ti, to decrease the coolant temperature. The control system operates the first and second electric machines 56 and 72 to generate sufficient tractive torque to meet the operator torque request during this operation.

The minimization routine described hereinabove can be applied to powertrain systems consisting of an engine and transmission system wherein the engine can be selectively deactivated and reactivated during the vehicle operating cycle and the engine operating point can be managed independently from the tractive power output through the output member 64 of the powertrain system. Another embodiment of the powertrain system is referred to as a belt-alternator-starter system (not shown). Using the control system described hereinabove with reference to FIGS. 2 and 3, the minimization routine can be executed to determine a preferred engine operation to minimize the total power loss $P_{LOSS\_TOT}$ and minimize the total energy loss. The two-dimensional search engine 260 iteratively generates engine operating points ranging across the allowable engine operating points. The engine operating points comprise the input speed and input torque ('$[Ni/Ti]_j$') and the ranges are within minimum and maximum input speeds and input torques ('NiMin', 'NiMax', 'TiMin', 'TiMax'). The minimum and maximum input speeds and input torques can comprise achievable input speeds and input torques, e.g., from engine idle operation to engine red-line operation. The input speed and input torque to the input member 12 can be adjusted and optimized, and tractive speed and power output from the transmission 10 can be managed by selectively controlling gearing of the transmission 10.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an internal combustion engine operatively connected to an electro-mechanical transmission to transmit tractive power to a driveline, comprising:

determining coolant temperature for the internal combustion engine;

adjusting power output of the engine based upon the coolant temperature and a preferred temperature coolant range; and, controlling the electro-mechanical transmission to transmit tractive power to the driveline to meet an operator torque request based upon the adjusted power output of the engine.

2. The method of claim 1, further comprising increasing the engine power output when the coolant temperature is less than the preferred coolant temperature range.

3. The method of claim 1, further comprising decreasing the engine power output when the coolant temperature exceeds the preferred coolant temperature range.

4. The method of claim 1 further comprising determining a preferred engine operation to achieve the preferred coolant temperature range and minimize a total energy loss.

5. The method of claim 1, further comprising determining a preferred engine operation based upon the adjusted engine power output;

estimating a future energy loss;

determining a total power loss and a rate of change in the estimated future energy loss; and adjusting the preferred engine operation to minimize the total power loss and the rate of change in the estimated future energy loss to achieve the preferred coolant temperature range and minimize the total energy loss during the engine operating cycle.

6. The method of claim 5, further comprising:

iteratively generating engine speed states and engine torque states;

calculating a total power loss and a rate of change in the estimated future energy loss for each of the iteratively generated engine speed states and engine torque states;

determining minimum values for the calculated total power loss and the rate of change in the estimated future energy loss; and, determining the preferred engine operation comprising an engine speed state and an engine torque state corresponding to the minimum values for the calculated total power loss and the rate of change in the estimated future energy loss.

7. The method of claim 6, wherein the preferred engine operation further comprises an engine state comprising one of an all-cylinder operation and a cylinder-deactivation operation.

8. The method of claim 7, wherein the preferred engine operation further comprises an engine operating mode comprising one of a stoichiometric air/fuel ratio operation and a rich air/fuel ratio operation.

9. The method of claim 8, further comprising executing a two-dimensional search engine to iteratively generate the engine speed states and the engine torque states.

10. The method of claim 6, wherein the total power loss includes an engine power loss and other powertrain losses.

11. The method of claim 10, wherein the engine power loss comprises a nominal engine power loss and a power loss correction.

12. The method of claim 11, wherein the power loss correction is based upon an engine air/fuel ratio mode, an engine cylinder deactivation state, and, an engine operating temperature mode.

13. Method for controlling an internal combustion engine operatively connected to an electro-mechanical transmission, comprising:

monitoring ambient operating conditions and engine operating conditions;

determining a coolant temperature;

adjusting power output of the engine based upon the coolant temperature and a preferred coolant temperature range; and, controlling the electro-mechanical transmission based upon the adjusted power output of the engine.

14. The method of claim 13, further comprising controlling the electro-mechanical transmission to transmit tractive power to the driveline based upon the adjusted power output of the engine.

15. The method of claim 14, further comprising controlling the electro-mechanical transmission to generate electric power based upon the adjusted power output of the engine.

16. The method of claim 14, further comprising:

estimating a future energy loss during an engine operating cycle;

determining a power loss and a rate of change in the estimated future energy loss during the engine operating cycle; and, determining the preferred engine operation to minimize the power loss and the rate of change in the estimated future energy loss to achieve the preferred coolant temperature range and minimize the total energy loss during the engine operating cycle.

17. The method of claim 16, further comprising:

iteratively generating engine speed states and engine torque states;

calculating a power loss and a rate of change in the estimated future energy loss for each of the iteratively generated engine speed states and engine torque states;

determining a minimum value for the calculated power loss and the rate of change in the estimated future energy loss; and, determining the preferred engine operation comprising an engine speed state and an engine torque state corresponding to the minimum value for the calculated power loss and the rate of change in the estimated future energy loss.

18. Method for controlling an internal combustion engine fluidly connected to an exhaust aftertreatment system and operatively connected to a transmission, comprising:

determining a coolant temperature;

adjusting an engine speed state and an engine torque state based upon the coolant temperature and a preferred coolant temperature range and minimize a total energy loss during an engine operating cycle;

controlling the engine to the adjusted engine speed state and engine torque state to achieve the preferred coolant temperature range; and, controlling the transmission to transmit tractive power to the driveline to meet an operator torque request based upon the preferred engine operation.

19. The method of claim 18, further comprising:

estimating a future energy loss for the engine operating cycle;

determining a power loss and a rate of change in the estimated future energy loss; and, adjusting the engine speed state and an engine torque state to minimize the power loss and the rate of change in the estimated future energy loss to achieve the preferred coolant temperature range and minimize the total energy loss.

20. The method of claim 19, wherein determining the adjusted engine speed state and an engine torque state comprises:

iteratively generating engine speed states and engine torque states;

calculating a power loss and a rate of change in the estimated future energy loss for each of the iteratively generated engine speed states and engine torque states;

determining a minimum value for the calculated power loss and the rate of change in the estimated future energy loss; and, determining a preferred engine operation comprising an engine speed state and an engine torque state corresponding to the minimum value for the calculated power loss and the rate of change in the estimated future energy loss.

* * * * *